(12) United States Patent
Wertz et al.

(10) Patent No.: US 10,808,684 B2
(45) Date of Patent: Oct. 20, 2020

(54) HEAT TRANSFER ASSEMBLY EMBEDDED IN A WIND TURBINE NACELLE

(71) Applicant: General Electric Company, Schenectady, NY (US)

(72) Inventors: Aaron Joseph Wertz, Cincinnati, OH (US); Michael Barclift, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/223,483

(22) Filed: Dec. 18, 2018

(65) Prior Publication Data

US 2020/0191125 A1 Jun. 18, 2020

(51) Int. Cl.
*F03D 80/60* (2016.01)
*F03D 9/25* (2016.01)
*B33Y 80/00* (2015.01)
*B33Y 10/00* (2015.01)

(52) U.S. Cl.
CPC ............... *F03D 80/60* (2016.05); *F03D 9/25* (2016.05); *B33Y 10/00* (2014.12); *B33Y 80/00* (2014.12); *F05B 2230/31* (2013.01)

(58) Field of Classification Search
CPC .... F28F 3/12; F28F 7/02; F03D 80/60; F03D 9/25; B33Y 10/00; B33Y 80/00; F05D 2230/31
See application file for complete search history.

(56) References Cited

U.S. PATENT DOCUMENTS

| 8,052,383 | B2 | 11/2011 | Frokjaer |
| 9,952,004 | B2 * | 4/2018 | Wright ...................... F28F 3/02 |
| 2010/0061853 | A1 | 3/2010 | Bagepalli |
| 2012/0235421 | A1 | 9/2012 | Wong et al. |
| 2015/0137412 | A1 | 5/2015 | Schalansky |
| 2018/0244127 | A1 | 8/2018 | Sennoun et al. |
| 2018/0323514 | A1 * | 11/2018 | Pance .................. H01Q 9/0485 |

FOREIGN PATENT DOCUMENTS

| CN | 108518320 A | 9/2018 |
| WO | WO 2010/026114 A2 | 3/2010 |
| WO | WO 2012/059463 A2 | 5/2012 |

OTHER PUBLICATIONS

European Search Report, dated Jun. 9, 2020 for EP Application No. 19216595.9.

* cited by examiner

*Primary Examiner* — Richard A Edgar
(74) *Attorney, Agent, or Firm* — Dority & Manning, P.A.

(57) ABSTRACT

A nacelle for a wind turbine includes a housing defining an outer wall and a heat transfer assembly embedded at least partially within the outer wall of the housing. The heat transfer assembly includes a heat transfer apparatus having a body with a flow path formed in an outer surface thereof and a working fluid configured to flow through the flow path. The heat transfer apparatus also includes a plate member arranged adjacent to the flow path of the body. As such, the plate member and the outer wall of the housing of the nacelle are configured to conduct heat from the working fluid to ambient air.

17 Claims, 6 Drawing Sheets

HEAT TRANSFER ASSEMBLY EMBEDDED IN A WIND TURBINE NACELLE

FIELD

The present disclosure relates in general to wind turbines, and more particularly to a heat transfer assembly embedded in a wind turbine nacelle.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The nacelle typically houses the generator, the gearbox, and various other mechanical and electrical components of the wind turbine. Therefore, such components generate heat that must be cooled off during operation of the wind turbine. Cooling of hot components in wind turbines, particularly cooling of the generator in off-shore wind turbines is currently accomplished using a complex system of ducts, fans, and/or large fabricated heat exchangers. However, such systems are complex, costly, and heavy.

Accordingly, an improved heat transfer assembly configured for cooling off components within the wind turbine nacelle and methods of manufacturing same that addresses the aforementioned issues would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a nacelle for a wind turbine. The nacelle includes a housing defining an outer wall and a heat transfer assembly embedded at least partially within the outer wall of the housing. The heat transfer assembly includes a heat transfer apparatus having a body with a flow path formed in an outer surface thereof and a working fluid configured to flow through the flow path. The heat transfer apparatus also includes a plate member arranged adjacent to the flow path of the body. As such, the plate member and the outer wall of the housing of the nacelle are configured to conduct heat from the working fluid to ambient air.

In one embodiment, the body of the heat transfer apparatus may be formed via at least one of an additive manufacturing process or injection molding. For example, in such embodiments, the additive manufacturing process may include big area additive manufacturing (BAAM), directed energy deposition, or material jetting.

In another embodiment, the body may be formed of a non-thermally conductive material. In such embodiments, the non-thermally conductive material may include a resin material, a ceramic material, or a low-conductivity material. More specifically, in certain embodiments, the resin material may include a thermoplastic material or a thermoset material.

In further embodiments, the plate member may be formed of a thermally-conductive material so as to conduct the heat from the working fluid to the ambient air. In such embodiments, the thermally-conductive material may include a metal material. In addition, the working fluid may include a fluid or a gas.

In particular embodiments, the heat transfer apparatus may be sized to fit within a recess of the outer wall of the nacelle of the wind turbine or to fit along a contour of a surface of the nacelle. In another embodiment, an inner surface of the body may face an interior of the nacelle, whereas the outer surface of the body may face the ambient air.

In additional embodiments, the heat transfer apparatus may also include a sealing layer arranged between the body and the plate member so as to minimize leakage of the working fluid. In another embodiment, the plate member may further include one or more protrusions so as to enhance a heat transfer coefficient of the heat transfer apparatus and to minimize an overall size of the heat transfer apparatus.

In several embodiments, the heat transfer apparatus may also include a pump, piping, or a blower for moving the working fluid through the body of the heat transfer apparatus and/or through the wind turbine.

In another aspect, the present disclosure is directed to a heat transfer assembly for a wind turbine. The heat transfer assembly includes a heat transfer apparatus having a body formed of a non-thermally conductive material via an additive manufacturing process. The body also a flow path formed in an outer surface thereof via the additive manufacturing process. The heat transfer apparatus further includes a working fluid configured to flow through the flow path and a plate member arranged adjacent to the flow path of the body. The plate member is formed of a thermally-conductive material so as to conduct heat from the working fluid to ambient air. It should also be understood that the heat transfer apparatus may further include any of the additional features described herein.

In yet another aspect, the present disclosure is directed to a method for manufacturing a heat transfer apparatus for a wind turbine. The method includes forming a base portion of a body of a non-thermally conductive material via an additive manufacturing process. The method also includes forming a flow path on an outer surface of the base portion of the body via the additive manufacturing process. Further, the method includes providing a working fluid within the flow path. Moreover, the method includes arranging a plate member adjacent to the flow path of the body. As such, the plate member is formed of a thermally-conductive material so as to conduct heat from the working fluid to ambient air.

In one embodiment, the method may further include pumping, via one or more pumps and associated piping, the working fluid through or across at least one the body of the heat transfer apparatus, the nacelle, or a tower of the wind turbine. In another embodiment, the method may also include extracting water from the ambient air via a condenser and expelling the water onto the heat transfer apparatus. It should also be understood that the method may further include any of the additional steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
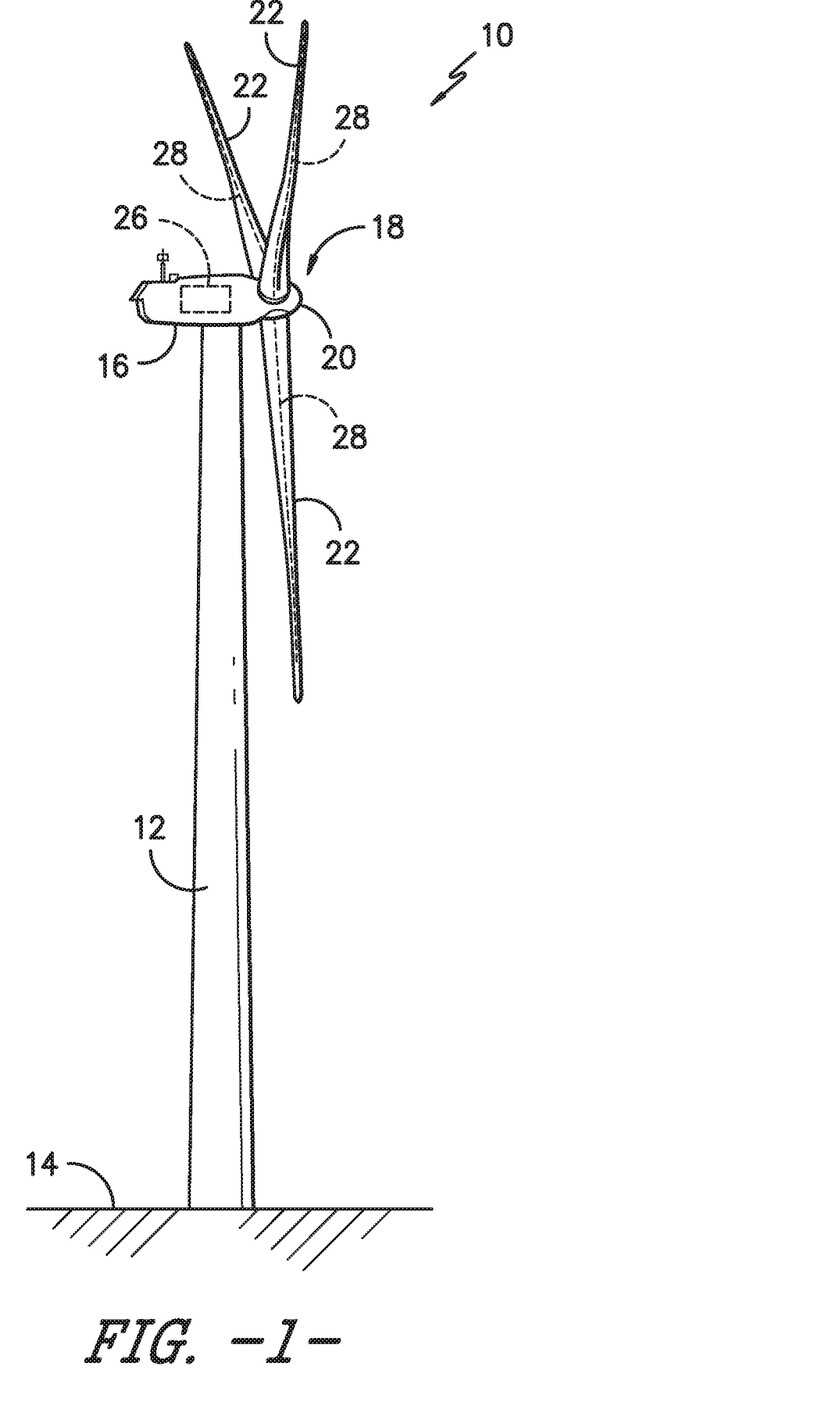
FIG. 1 illustrates a perspective view of one embodiment of a wind turbine according to the present disclosure.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotation of the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 2:
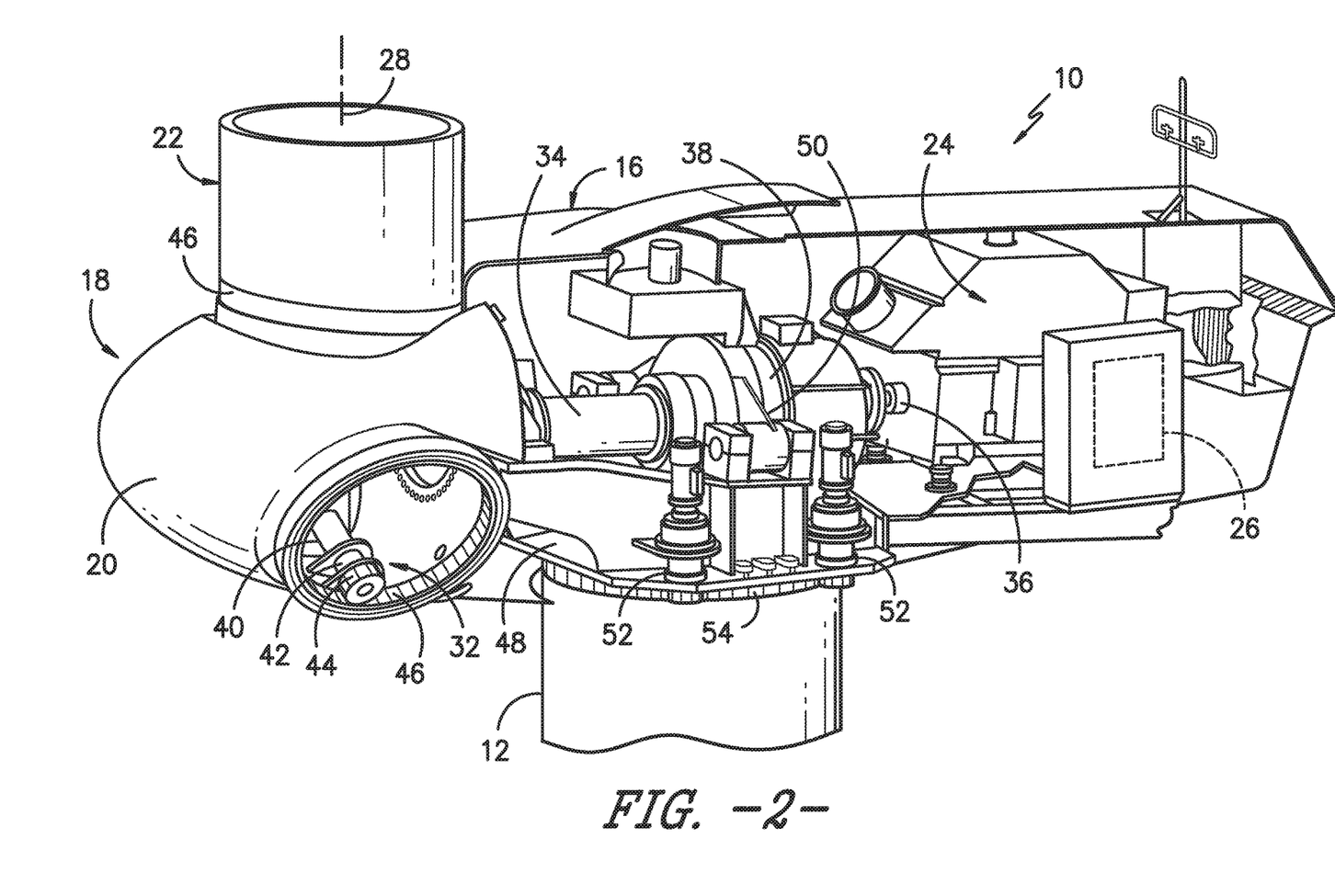
FIG. 2 illustrates a detailed, internal view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, the wind turbine 10 includes the generator 24 housed within the nacelle 16, which is coupled to the rotor 18 for producing electrical power from the rotational energy generated by the rotor 18. For example, as shown, the rotor 18 may include a rotor shaft 34 coupled to the hub 20 for rotation therewith. The rotor shaft 34 may, in turn, be rotatably coupled to a generator shaft 36 of the generator 24 through a gearbox 38 connected to a bedplate support frame 48 by a torque support 50. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 52 communicatively coupled to the controller 26, with each yaw drive mechanism(s) 52 being configured to change the angle of the nacelle 16 relative to the wind (e.g., by engaging a yaw bearing 54 of the wind turbine 10).

Figure 3:
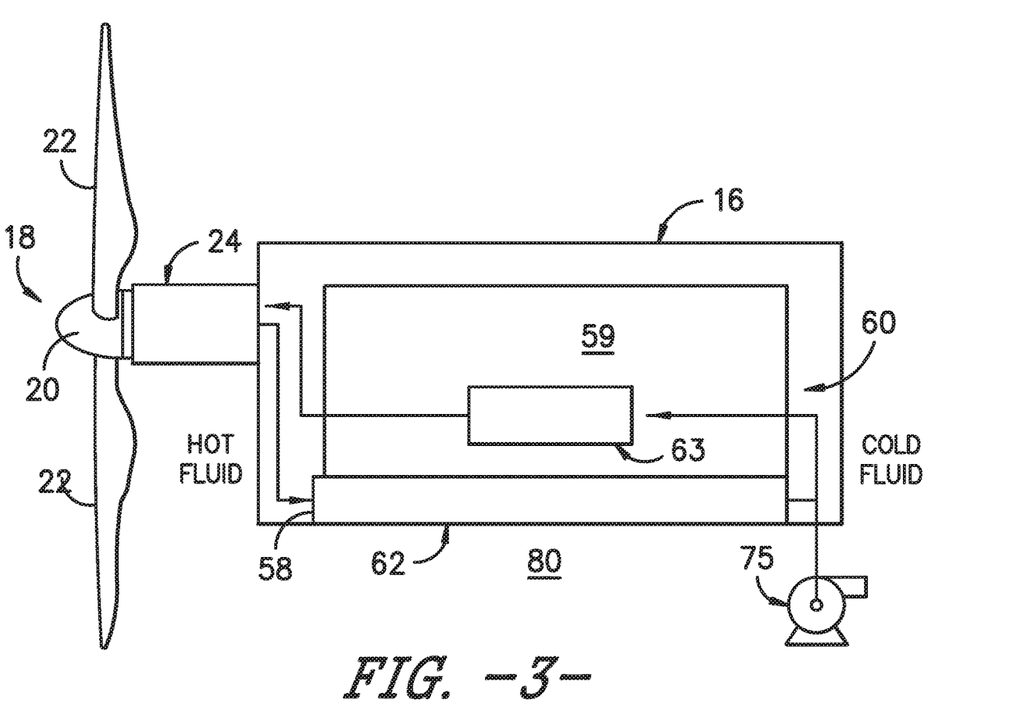
FIG. 3 illustrates a schematic diagram of one embodiment of a heat transfer assembly for a wind turbine nacelle according to the present disclosure.
Figure 4:
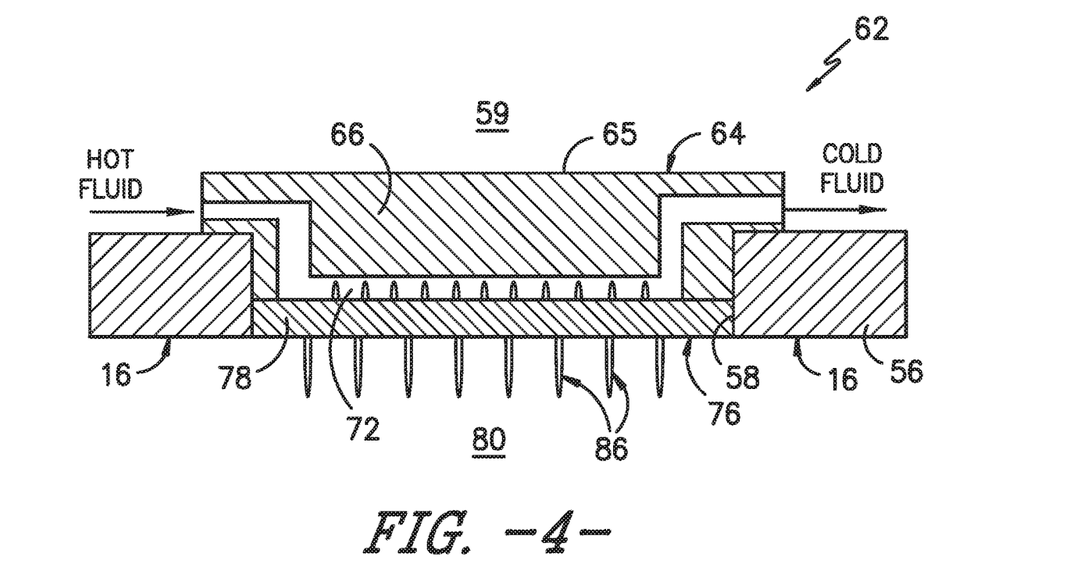
FIG. 4 illustrates a cross-sectional view of one embodiment of a heat transfer apparatus of a heat transfer assembly for a wind turbine nacelle according to the present disclosure.

The various components within the nacelle 16 may generate excessive heat that needs to be dissipated to ambient air. As such, the present disclosure is directed to a heat transfer assembly 60 for cooling off such components within the nacelle 16 (or any other location of the wind turbine 10). More specifically, as shown in FIGS. 3 and 4, schematic diagrams of one embodiment of the heat transfer assembly 60 according to the present disclosure are illustrated. Further, as shown, the heat transfer assembly 60 includes a heat transfer apparatus 62, e.g. embedded within an outer wall 56 of the nacelle 16. Thus, as shown in the illustrated embodiment, heat from the generator 24 can be removed via a hot fluid path, e.g. via a duct. The heat transfer apparatus 62 then receives the hot fluid and cools it down such that the cool or cold fluid can then be sent to a compressor/condenser 63. The compressed cooled fluid can then be recirculated back to the generator 24.

Figure 5:
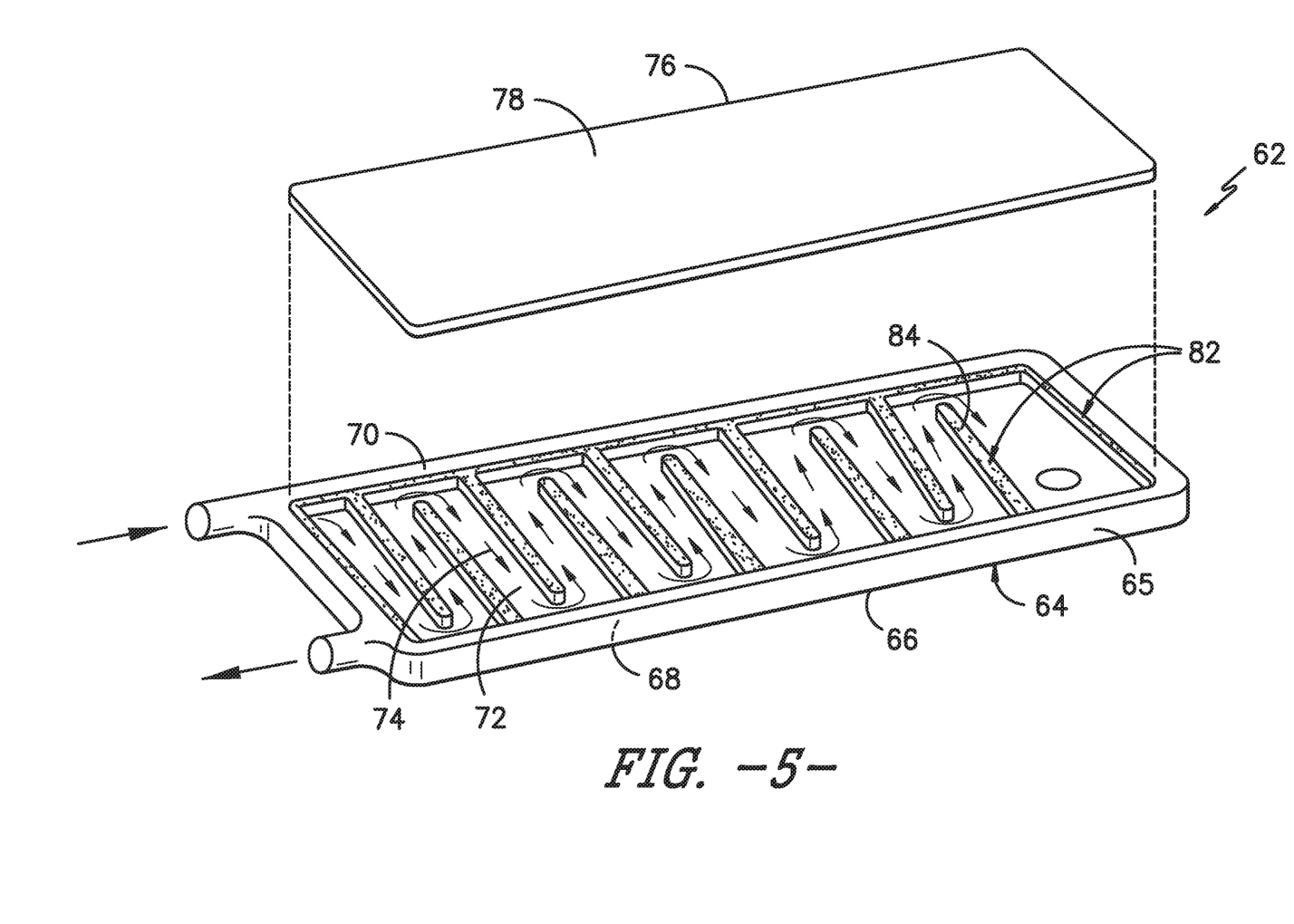
FIG. 5 illustrates an exploded, perspective view of one embodiment of a heat transfer apparatus of a heat transfer assembly for a wind turbine nacelle according to the present disclosure.

Referring now particularly to FIGS. 4 and 5, the heat transfer apparatus 62 also includes a body 64 having a base portion 65 formed of a non-thermally conductive material 66 via an additive manufacturing process. For example, in one embodiment, the non-thermally conductive material 66 may be a thermoplastic material or a thermoset material. Further, as shown, the base portion 65 of the body 64 may define a generally linear cross-sectional shape, i.e. so that the body 64 can easily be embedded or recessed with the outer wall 56 of the nacelle 16. In addition, as shown, the base portion 65 of the body 64 includes an inner surface 68 and an outer surface 70 having a flow path 72 extending therefrom. In such embodiments, the flow path 72 may also be formed via the additive manufacturing process. Thus, as shown, the flow path 72 may be a simple serpentine flow path or a more complex path which is enabled by the additive manufacturing process.

As used herein, additive manufacturing generally refers to processes used to create a three-dimensional object in which layers of material are deposited or formed under computer control to create an object. Thus, in certain embodiments, the additive manufacturing process described herein may include, for example, big area additive manufacturing (BAAM), directed energy deposition, material jetting, or any other suitable additive manufacturing technique.

Still referring to FIG. 5, the heat transfer apparatus 62 also includes a working fluid 74 configured to flow through the flow path 72. In several embodiments, the heat transfer assembly 60 may also include a pumping device 75, such as a pump or a blower for moving the working fluid 74 through the body 64. In addition, the working fluid 74 described herein may be a gas or a liquid. Further, as shown, the heat transfer apparatus 62 also includes a plate member 76 arranged adjacent to the flow path 72 of the body 64. Thus, as shown, the plate member 76 may be formed of a thermally-conductive material 78 so as to conduct heat from the working fluid 74 to ambient air 80. In such embodiments, the thermally-conductive material 78 may be a metal material, such as for example, aluminum, steel, or titanium. In certain embodiments, as shown in FIGS. 3 and 5, the plate member 76 may have a relatively smooth cross section. Alternatively, as shown in FIG. 4, the plate member 76 may include one or more protrusions 86 or fins to enhance a heat transfer coefficient of the heat transfer apparatus 62 and/or to minimize an overall size of the heat transfer apparatus 62.

Referring back to FIG. 5, the heat transfer apparatus 62 may include a sealing layer 82 arranged between the body 64 and the plate member 76 so as to minimize leakage of the working fluid 74. For example, as shown, the sealing layer 82 may include a sealing material 84 spaced apart along the flow path 72. In such embodiments, the sealing material 84 may be, for example, a polymer, an adhesive, silicone, rubber, or any other suitable sealant.

Figure 6:
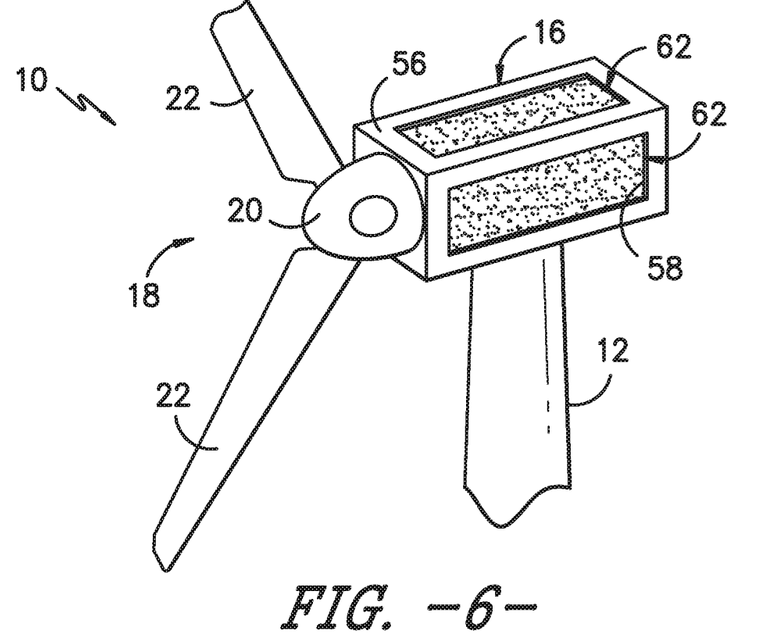
FIG. 6 illustrates a perspective view of one embodiment of nacelle of a wind turbine according to the present disclosure, particularly illustrating a heat transfer apparatus of a heat transfer assembly embedded lengthwise within multiple sides of an outer wall of the nacelle.
Figure 7:
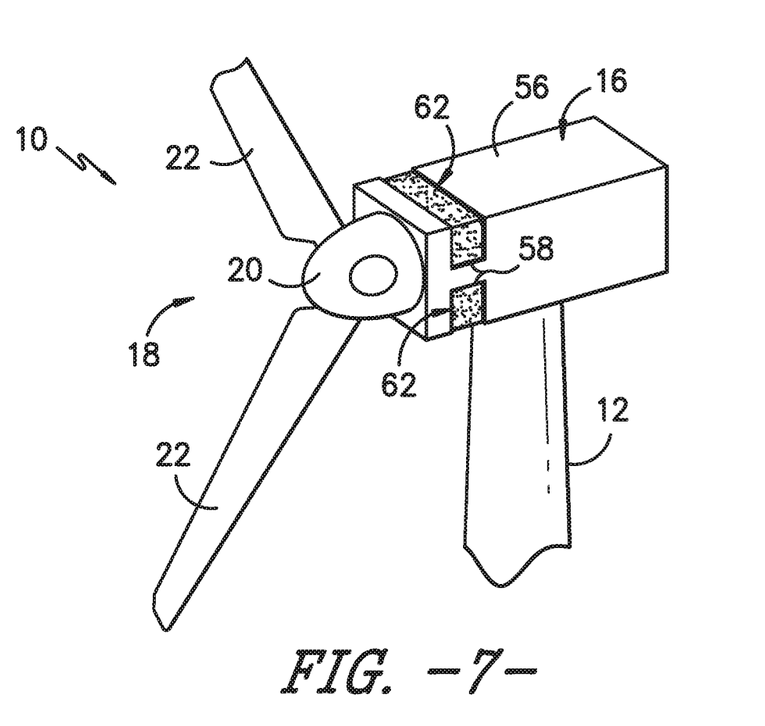
FIG. 7 illustrates a perspective view of one embodiment of nacelle of a wind turbine according to the present disclosure, particularly illustrating a heat transfer apparatus of a heat transfer assembly embedded around the outer wall of the nacelle.

Referring now to FIGS. 3-4 and 6-7, the heat transfer apparatus 62 may be sized to fit within a recess 58 of the outer wall 56 of the nacelle 16. In addition, as shown in FIG. 6, the heat transfer apparatus 62 may extending along one of the sides of the nacelle 16. Alternatively, as shown in FIG. 7, the heat transfer apparatus 62 may fit along a contour or edge of the outer wall 56 of the nacelle 16. Thus, as shown generally in FIGS. 3-5, the inner surface 68 of the body 64 may face an interior 59 of the nacelle 16, whereas the outer surface 70 of the body 64 may face the ambient air 80.

Figure 8:
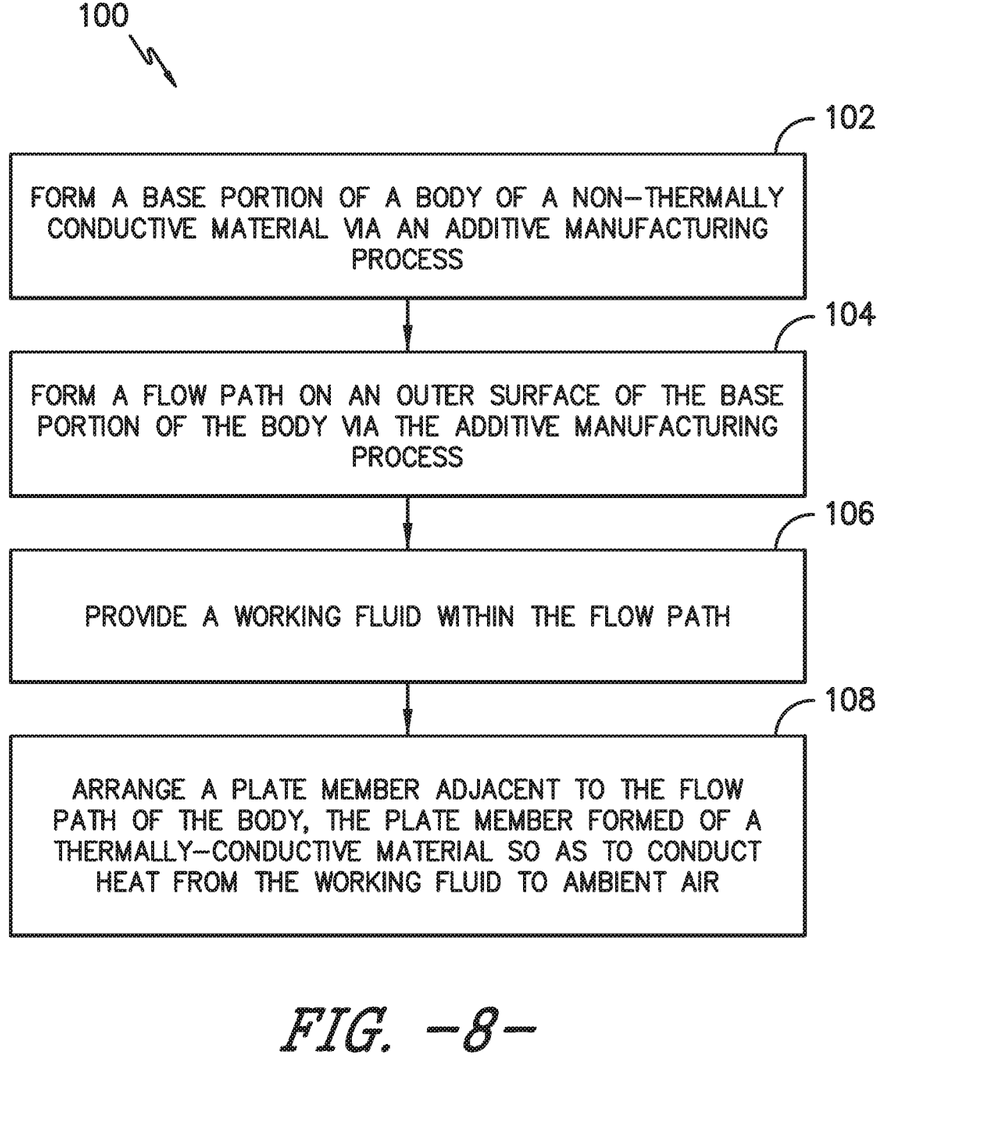
FIG. 8 illustrates a flow chart of one embodiment of a method for manufacturing a heat transfer apparatus for a wind turbine according to the present disclosure.

Referring now to FIG. 8, a flow diagram of one embodiment of one embodiment of a method 100 for manufacturing a heat transfer apparatus for a wind turbine 10 according to the present disclosure is illustrated. In general, the method 100 will be described herein with reference to the wind turbine 10, nacelle 16, and heat transfer apparatus 62 shown in FIGS. 1-7. However, it should be appreciated that the disclosed method 100 may be implemented with wind turbines having any other suitable configurations. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (102), the method 100 may include forming the base portion 65 of the body 64 of the non-thermally conductive material 66 via an additive manufacturing process. As shown at (104), the method 100 may include forming the flow path 72 on or into the outer surface 70 of the base portion 65 of the body 64 via the additive manufacturing process. As shown at (106), the method 100 may include providing the working fluid 74 within the flow path 72. As shown at (108), the method 100 may include arranging the plate member adjacent to the flow path 72 of the body 64. Further, as mentioned, the plate member 76 is formed of the thermally-conductive material 78 so as to conduct heat from the working fluid 74 to ambient air 80.

In one embodiment, the method 100 may further include pumping, via one or more pumps and associated piping, the working fluid 74 through or across the body 64 of the heat transfer apparatus 62, the nacelle 16, and/or the tower 12 of the wind turbine 10. In another embodiment, the method 100 may also include extracting water from the ambient air via the condenser 63 and expelling the water onto the heat transfer apparatus 62. In other words, the heat transfer apparatus 62 provides the ability to pump water up to the nacelle 16 via passages or piping in the tower 12. In addition, the condenser can extract water from the air and expel the water onto the surface (plate member/fins) of the heat transfer apparatus 62, i.e. either periodically or constantly via a mist, pore-like orifices in the convection surface, or a steady stream of water running down the convection surface. Such water provides evaporative cooling as needed in order to temporarily enhance the heat transfer coefficient of the heat transfer apparatus 62 in times of high thermal loading (e.g. warm or hot days with high power output).

The thermoplastic material as described herein may generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethylmethyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset material as described herein may generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A nacelle for a wind turbine, the nacelle comprising:
   a housing defining an outer wall; and,
   a heat transfer assembly embedded at least partially within the outer wall of the housing, the heat transfer assembly comprising a heat transfer apparatus, the heat transfer apparatus comprising a body comprising a flow path formed in an outer surface thereof and a working fluid configured to flow through the flow path, the heat transfer apparatus further comprising a plate member arranged adjacent to the flow path of the body,
   wherein the plate member and the outer wall of the housing of the nacelle are configured to conduct heat from the working fluid to ambient air.

2. The nacelle of claim 1, wherein the body of the heat transfer apparatus is formed via one of an additive manufacturing process or injection molding.

3. The nacelle of claim 2, wherein the additive manufacturing process comprises one of big area additive manufacturing (BAAM), directed energy deposition, or material jetting.

4. The nacelle of claim 1, wherein the body is formed of a non-thermally conductive material.

5. The nacelle of claim 4, wherein the non-thermally conductive material comprises at least one of a resin material, a ceramic material, or a low-conductivity material, the resin material comprising one of a thermoplastic material or a thermoset material.

6. The nacelle of claim 1, wherein the plate member is formed of a thermally-conductive material so as to conduct the heat from the working fluid to the ambient air.

7. The nacelle of claim 6, wherein the thermally-conductive material comprises a metal material and the working fluid comprises one of a fluid or a gas.

8. The nacelle of claim 1, wherein the heat transfer apparatus is sized to fit within a recess of the outer wall of the nacelle of the wind turbine or to fit along a contour of a surface of the nacelle.

9. The nacelle of claim 1, wherein an inner surface of the body faces an interior of the nacelle and the outer surface of the body faces the ambient air.

10. The nacelle of claim 1, wherein the heat transfer apparatus further comprises a sealing layer arranged between the body and the plate member so as to minimize leakage of the working fluid.

11. The nacelle of claim 1, wherein the plate member comprises one or more protrusions so as to enhance a heat transfer coefficient of the heat transfer apparatus and to minimize an overall size of the heat transfer apparatus.

12. The nacelle of claim 1, further comprising one of a pump, piping, or a blower for moving the working fluid through the body of the heat transfer apparatus and/or through the wind turbine.

13. A heat transfer assembly for a wind turbine, the heat transfer assembly comprising:
    a heat transfer apparatus comprising:
       a body formed of a non-thermally conductive material via an additive manufacturing process, the body comprising a flow path formed in an outer surface thereof via the additive manufacturing process;
       a working fluid configured to flow through the flow path; and,
       a plate member arranged adjacent to the flow path of the body, the plate member formed of a thermally-conductive material so as to conduct heat from the working fluid to ambient air,
    wherein the heat transfer apparatus is sized to fit within a recess of a wall of a nacelle of the wind turbine or to fit along a contour of an exterior surface of the nacelle, and wherein an inner surface of the body faces an interior of the nacelle and the outer surface of the body faces the ambient air.

14. The heat transfer assembly of claim 13, wherein the heat transfer apparatus further comprises a sealing layer arranged between the body and the plate member so as to minimize leakage of the working fluid.

15. A method for manufacturing a heat transfer apparatus for a wind turbine, the method comprising:
    forming a base portion of a body of a non-thermally conductive material via an additive manufacturing process;
    forming a flow path on an outer surface of the base portion of the body via the additive manufacturing process;
    providing a working fluid within the flow path;
    pumping, via one or more pumps and associated piping, the working fluid through or across one of the body of the heat transfer apparatus, the nacelle, or a tower of the wind turbine; and,
    arranging a plate member adjacent to the flow path of the body, the plate member formed of a thermally-conductive material so as to conduct heat from the working fluid to ambient air.

16. The method of claim 15, wherein the additive manufacturing process comprises one of big area additive manufacturing (BAAM), directed energy deposition, or material jetting.

17. The method of claim 15, further comprising extracting water from the ambient air via a condenser and expelling the water onto the heat transfer apparatus.

* * * * *